(12) United States Patent
Mun et al.

(10) Patent No.: US 12,549,794 B2
(45) Date of Patent: Feb. 10, 2026

(54) ENABLING MEDIA FEATURES PROVIDED ON A FIRST SCREEN DEVICE TO BE PRESENTED ON A SECOND SCREEN DEVICE

(71) Applicant: Google LLC, Mountain View, CA (US)

(72) Inventors: Aran Mun, Oakland, CA (US); Sana Mithani, Plantation, FL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/758,465

(22) Filed: Jun. 28, 2024

(65) Prior Publication Data

US 2024/0354042 A1 Oct. 24, 2024

Related U.S. Application Data

(63) Continuation of application No. 17/043,645, filed as application No. PCT/US2020/026229 on Apr. 1, 2020, now Pat. No. 12,073,140.

(51) Int. Cl.
*G06F 3/0482* (2013.01)
*G06F 3/14* (2006.01)
(Continued)

(52) U.S. Cl.
CPC ....... *H04N 21/4122* (2013.01); *G06F 3/0482* (2013.01); *G06F 3/1423* (2013.01);
(Continued)

(58) Field of Classification Search
CPC .... G06F 3/0481; G06F 3/04842; H04N 5/765
See application file for complete search history.

(56) References Cited

U.S. PATENT DOCUMENTS 10,397,640 B2   8/2019  Cormican et al.
2006/0075348 A1*  4/2006  Xu ................. G06F 3/04842
                                                                715/764
(Continued)

FOREIGN PATENT DOCUMENTS

CN    105828139 A    8/2016
CN    304742504 S    7/2018
(Continued)

OTHER PUBLICATIONS

International Preliminary Report on Patentability for International Application No. PCT/US2020/026229, mailed Oct. 13, 2022, 9 Pages.

(Continued)

*Primary Examiner* — Kevin M Nguyen
(74) *Attorney, Agent, or Firm* — Lowenstein Sandler LLP

(57) ABSTRACT

A method includes presenting, in a user interface on a first screen device, a primary media item comprising a video, and one or more secondary media items related to the primary media item. The primary media item and the one or more secondary media items are concurrently presented on a second screen device which is in a pairing session with the first screen device. User input is received, via the user interface on the first screen device, indicating a user request to disable presentation of the at least one of the secondary media items on the second screen device. In response to the user input, at least one of the secondary media items is caused to be no longer presented on the second screen device.

20 Claims, 7 Drawing Sheets

(51) Int. Cl.
*H04L 65/1069* (2022.01)
*H04L 65/1083* (2022.01)
*H04L 65/65* (2022.01)
*H04N 21/41* (2011.01)

(52) U.S. Cl.
CPC ...... *H04L 65/1069* (2013.01); *H04L 65/1083* (2013.01); *H04L 65/65* (2022.05)

(56) References Cited

U.S. PATENT DOCUMENTS

| | | | |
|---|---|---|---|
| 2012/0144416 | A1 | 6/2012 | Wetzer et al. |
| 2013/0148720 | A1 | 6/2013 | Rabii |
| 2013/0198642 | A1 | 8/2013 | Carney et al. |
| 2013/0285937 | A1 | 10/2013 | Billings et al. |
| 2015/0026743 | A1 | 1/2015 | Kim et al. |
| 2015/0128163 | A1 | 5/2015 | Cormican et al. |
| 2015/0128179 | A1 | 5/2015 | Cormican et al. |
| 2016/0006864 | A1 | 1/2016 | Park et al. |
| 2016/0078903 | A1* | 3/2016 | Chitnis ............... H04N 5/765 386/219 |
| 2016/0227162 | A1 | 8/2016 | Bargetzi et al. |
| 2017/0063902 | A1 | 3/2017 | Muddu et al. |
| 2017/0085934 | A1 | 3/2017 | Evans et al. |
| 2018/0063501 | A1 | 3/2018 | Chen |
| 2018/0103079 | A1 | 4/2018 | Lewis et al. |
| 2018/0364881 | A1 | 12/2018 | Lee et al. |
| 2023/0009446 | A1 | 1/2023 | Mun et al. |

FOREIGN PATENT DOCUMENTS

| | | |
|---|---|---|
| CN | 108632658 A | 10/2018 |
| CN | 109660842 A | 4/2019 |
| JP | 2009290395 A | 12/2009 |
| JP | 2014203045 A | 10/2014 |
| JP | 2015526964 A | 9/2015 |
| JP | 2015207182 A | 11/2015 |
| JP | 2016133886 A | 7/2016 |
| JP | 2017085260 A | 5/2017 |
| KR | 20140055981 A | 5/2014 |
| KR | 20150046291 A | 4/2015 |
| KR | 20150068556 A | 6/2015 |
| KR | 20150071975 A | 6/2015 |
| KR | 20160096117 A | 8/2016 |
| KR | 20170076406 A | 7/2017 |
| KR | 20170123184 A | 11/2017 |
| KR | 20180128994 A | 12/2018 |
| WO | 2013103582 A1 | 7/2013 |
| WO | 2016072825 A1 | 5/2016 |
| WO | 2017173793 A1 | 10/2017 |

OTHER PUBLICATIONS

International Search Report and Written Opinion for International Application No. PCT/US2020/026229, mailed Dec. 9, 2020, 11 Pages.
Notice of Allowance for Chinese Patent Application No. 202080070300.0, mailed May 30, 2024, 7 Pages.
Office Action for Australian Patent Application No. 2023241344 mailed Jun. 7, 2024, 03 Pages.
Office Action for Chinese Application No. CN20208070300, mailed Jul. 28, 2023, 19 Pages.
Office Action for Chinese Patent Application No. CN202080070300.0, mailed Feb. 7, 2024, 24 Pages.
Office Action for European Patent Application No. EP20723604.3, mailed Feb. 23, 2024, 5 Pages.
Office Action for Indian Patent Application No. 202348032918, mailed Apr. 22, 2024, 06 Pages.
Office Action for Japanese Patent Application No. 2022-527206, mailed Jun. 17, 2024, 3 Pages.
Office Action for Japanese Patent Application No. 2022527206, mailed Aug. 28, 2023, 21 Pages.
Office Action for Japanese Patent Application No. 2022527206, mailed Jan. 29, 2024, 14 Pages.
Office Action for Korean Patent Application No. 2022-7020091, mailed Oct. 19, 2023, 18 Pages.
Office Action for Australian Patent Application No. 2023241344 mailed Nov. 26, 2024, 3 Pages.
Office Action for Korean Patent Application No. 10-2022-7020091, mailed Jun. 11, 2024, 16 Pages.
Office Action for Japanese Patent Application No. 2024108901, mailed Oct. 28, 2025, 3 Pages.

* cited by examiner

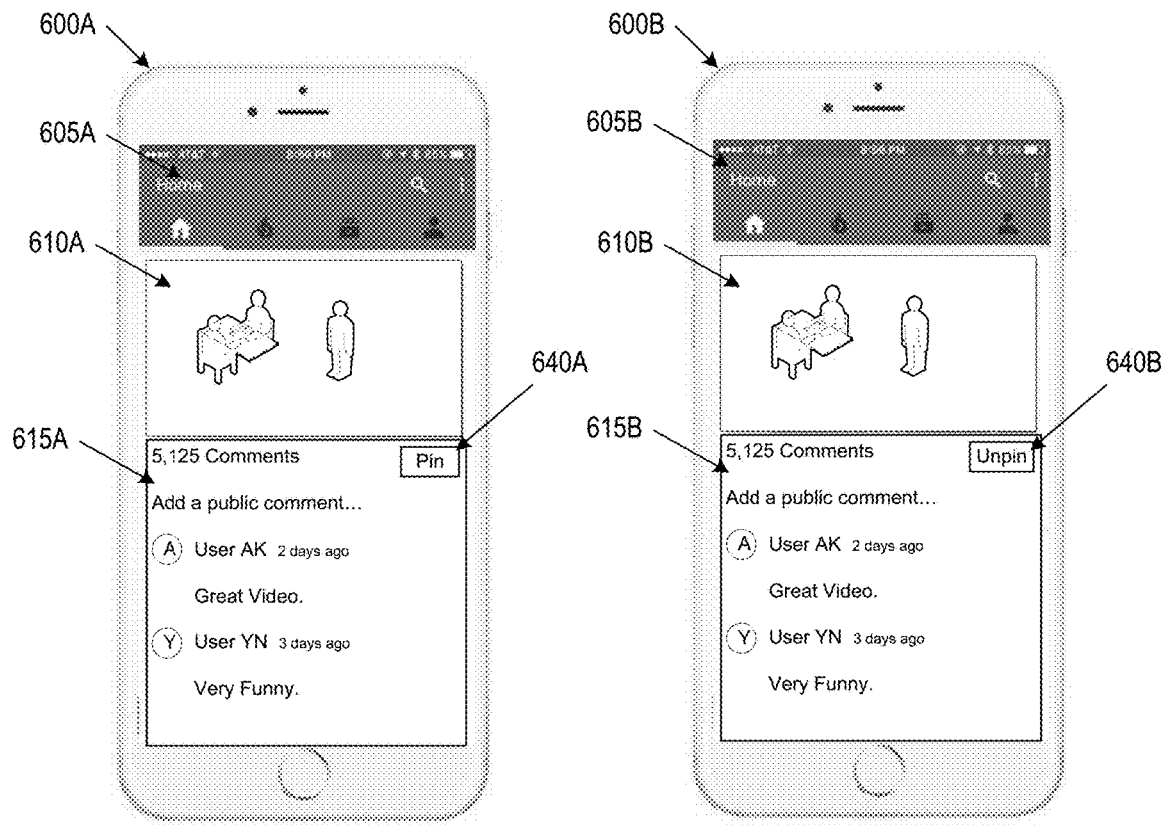
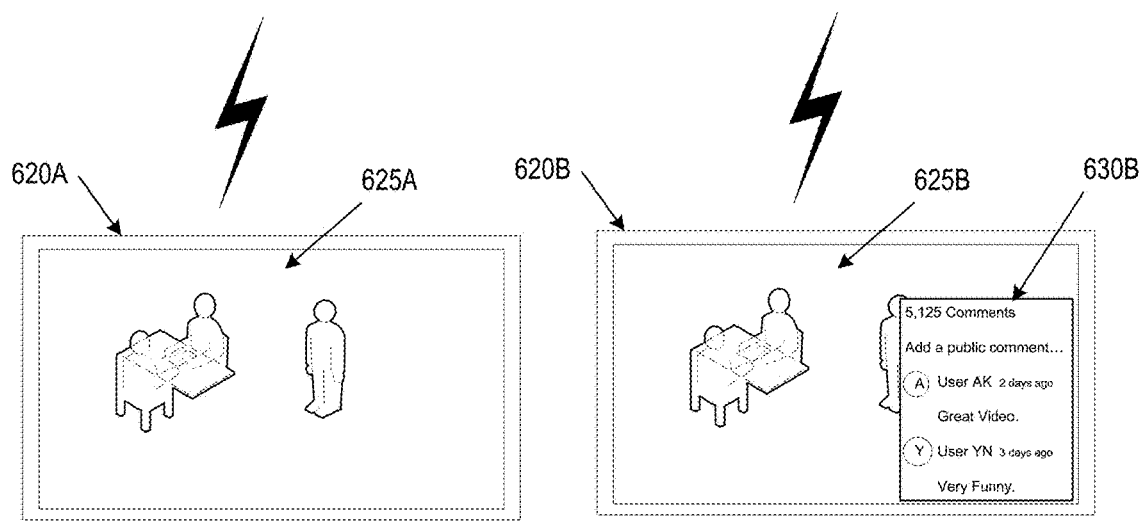
FIG. 6A  FIG. 6B

ENABLING MEDIA FEATURES PROVIDED ON A FIRST SCREEN DEVICE TO BE PRESENTED ON A SECOND SCREEN DEVICE

RELATED APPLICATIONS

This application is a Continuation of U.S. patent application Ser. No. 17/043,645, filed Sep. 29, 2020, which is a 371 application of International Application No. PCT/US20/26229, filed Apr. 1, 2020, both of which are incorporated herein by reference.

TECHNICAL FIELD

The present disclosure generally relates to a technique for providing media items for playback on alternative playback devices paired to a user device. More particularly, the present disclosure generally relates to a technique for enabling media features provided on a first screen device to be presented on a second screen device that is paired to the first screen device.

BACKGROUND

Existing systems for provisioning media content (e.g., videos, music) from a server to one or more user devices (e.g., first screen devices) generally use a protocol for streaming such content from the server to the user device. On typical user devices, applications or players may be available to receive and use/play such content. The user device may be in proximity to an external media streaming device that streams content for presentation on output devices (e.g., second screen devices), such as a television. The user device can display various media content (e.g., videos, music) to a user, and the user may select media content for playback on either the user device or an output device of the media streaming device using for example, a casting protocol.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a method includes presenting, in a user interface on a first screen device, a primary media item comprising a video, and one or more secondary media items related to the primary media item. The primary media item and the one or more secondary media items are concurrently presented on a second screen device which is in a pairing session with the first screen device. User input is received, via the user interface on the first screen device, indicating a user request to disable presentation of the at least one of the secondary media items on the second screen device. In response to the user input, at least one of the secondary media items is caused to be no longer presented on the second screen device.

In an aspect of the present disclosure, a method includes presenting, by a first screen device, a primary media item and one or more secondary media items. The primary media item and the one or more secondary media items are concurrently presented on a second screen device which is in a pairing session with the first screen device. A request is received from the second screen device to disable presentation of at least one of the secondary media items on the first screen device. In response to the request, a presentation of the at least one of the secondary media items is ended on the first screen device.

A further aspect of the disclosure provides a system comprising: a memory; and a processing device, coupled to the memory, the processing device to perform a method according to any aspect or embodiment described herein.

A further aspect of the disclosure provides a non-transitory computer-readable medium comprising instructions that, responsive to execution by a processing device, cause the processing device to perform operations according to any aspect or embodiment described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 6A-B illustrate example graphical user interfaces (GUI) on a first screen device to enable a media feature provided on the first screen device to be presented on a second screen device, in accordance with an implementation of the disclosure.

DETAILED DESCRIPTION

Figure 1:
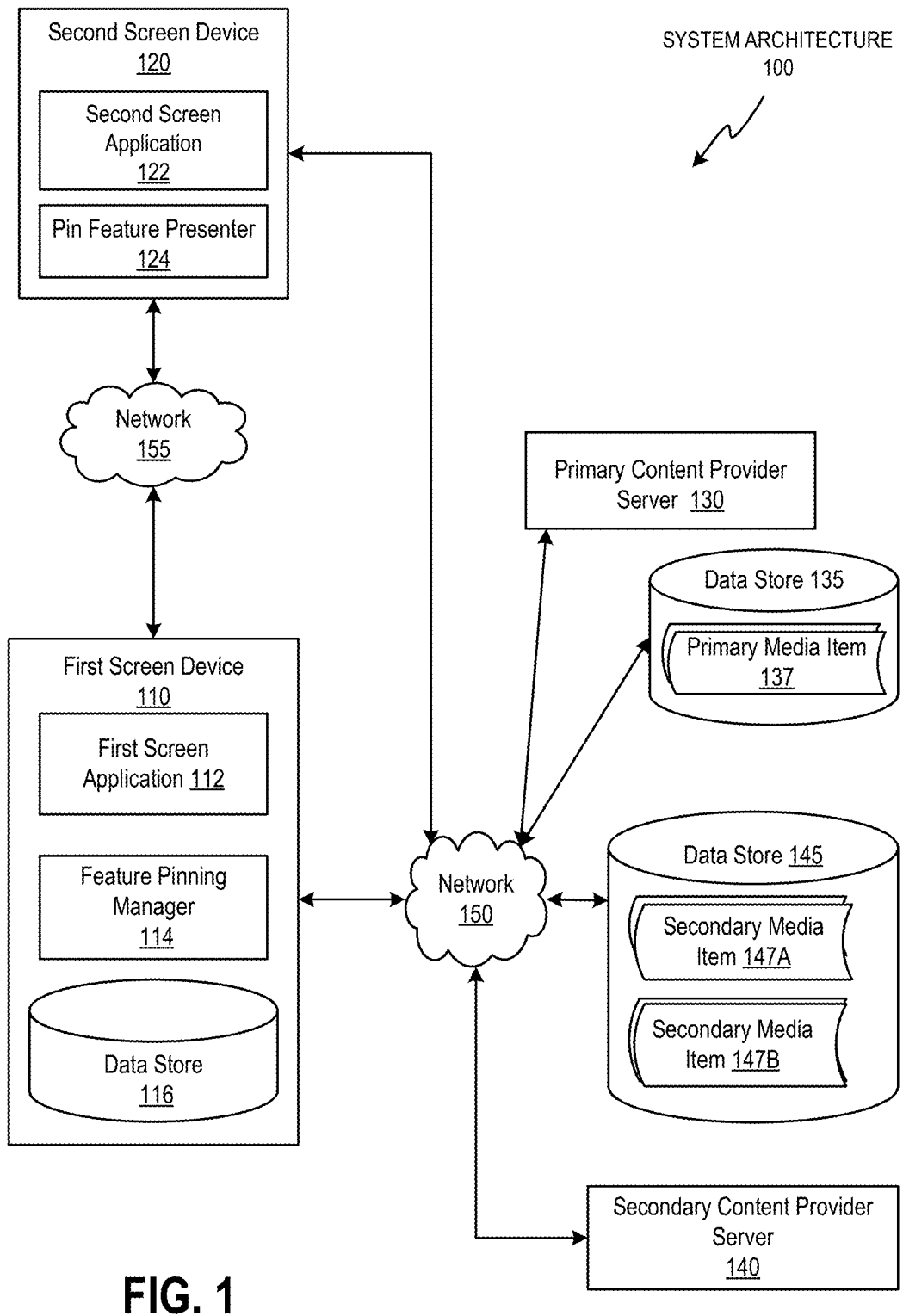
FIG. 1 illustrates an example of system architecture for enabling media features provided on a first screen device to be presented on a second screen device, in accordance with one implementation of the disclosure.

Aspects and implementations of the present disclosure provide a mechanism for enabling media features provided on a first screen device (e.g., a smartphone, a laptop, etc.) to be presented on a second screen device that the first screen device is paired to. The second screen device is a computing device, such as a television, that can receive instructions from the first screen device to play a media item on a display that is separate from the first screen device. Media items can include, for example, a digital video, web page content, mobile application ("app") content, user feedback features, digital images, and/or digital audio. The media items can be primary media items and secondary media items. A primary media item can include, for example, web page content and mobile app content (e.g., videos, audio, images, etc.). A secondary media item can include, for example, a comment section, a live chat, a user poll, a recommended video, recommended audio, an advertisement, or any other media feature related to the primary media item. A secondary media item is hereinafter also referred to as a media feature. A primary media item can be associated with one or more secondary media items. For example, the primary media item can be a video and the secondary media item can be a live chat displayed in relation to the video.

In existing content provider systems, a server can transmit media content to a first screen device for playback. The media content may be associated with multiple media features, such as comment threads, live chats, user polls, etc. that can be displayed on the first screen device in connection with the presented media content. The first screen device can cause the media content to be presented on a second screen device (e.g., via casting or mirroring technology). For example, a user watching a video on their smartphone (e.g., a first screen device) can request that the video be played on a television (e.g., a second screen device) that is paired with the smartphone. However, currently the television can play the video but without any media features associated with the video, such as comment sections or live chats. As a result, the user is able to watch the video on the television but has to use his or her smartphone to view comments or live chats associated with the video, see what other videos are being recommended, or view any other data pertaining to the presentation of the video or feedback about the video. Furthermore, if the user is watching the video on the television with other people in the room (e.g., his or her family or friends), these other people with have to use their own smartphones to be able to view comments or live chats associated with the video or any other data pertaining to the presentation of the video or feedback about the video. Viewing such data via a different device(s) distracts user attention from watching the video and negatively affects user experience with the content provider system.

Aspects of the present disclosure address the above and other deficiencies by providing a mechanism for enabling a first screen device to enable one or more media features associated with a primary media item that are provided on the first screen device to be presented on a second screen device while the second screen device is displaying the primary media item that has been identified on the first screen device.

According to some aspects of the present disclosure, a first screen device establishes a pairing session between itself and a second screen device. The first screen device presents, in a user interface, a video and at least one media feature (or secondary media item) related to the video. The video can be identified on the first screen device for presentation on the second screen device, where the video can be presented concurrently by both the first screen device and the second screen device. In response to receiving a user input identifying a media feature for presentation on the second screen device, the first screen device can cause (e.g., using casting or mirroring technology discussed below) the media feature to be presented on the second screen device. The identified media feature can be displayed concurrently on the first screen device and the second screen device along with the video.

Accordingly, aspects and implementations of the present disclosure enable a user to identify ("pin") media features in addition to videos and other primary media content on the first screen device for presentation on the second screen device. In another aspect, the first screen device can "unpin" previously pinned media features from the second screen device.

The technology disclosed herein is advantageous because it overcomes the limited abilities and functions currently available to users that identify videos or other primary media items on first screen devices for presentation on second screen devices. Instead, users are now capable of pinning, from a first screen device to a second screen device, various media features associated with a video. As such, the technology disclosed herein enables the user to have a more immersive and interactive viewing experience, and to share this experience with the user's friends and family.

Implementations of the present disclosure often reference videos for simplicity and brevity. However, the teaching of the present disclosure are applied to media items generally and may be applied to various types of content, including for example, video, audio, text, images, program instructions, etc.

FIG. 1 illustrates an example of system architecture 100, in accordance with one implementation of the present disclosure. The system architecture 100 includes one or more first screen devices (e.g., first screen device 110), one or more second screen devices (e.g., second screen device 120), one or more servers (e.g., primary content provider server 130, secondary content provider server 140), one or more networks (e.g., network 150, network 155), and one or more data stores (e.g., data store 135, data store 145).

The content provider servers 130,140 can be coupled to one or more data stores 135,145 that store media items. The primary content provider server 130 can be a web service provider, a digital video provider, a music provider, a social media provider, etc. The media items can be primary media items 137 and secondary media items 147 A-B (media features). For brevity and simplicity, one primary media item 137 and one secondary media item (e.g., secondary media item 147A, secondary media item 147B) (media feature) can be used as examples throughout this disclosure. The primary media items 137 and secondary media items 147A-B can be digital content chosen by a user, digital content made available by a user, digital content uploaded by a user, digital content chosen by a content provider, digital content chosen by a broadcaster, etc. Examples of primary media items 137 include, but are not limited to, digital videos, digital audio, web page content, mobile app content, digital phones, social media content, real simple syndication (RSS) feeds, software applications, gaming applications, live streams, electronic books (ebooks), or any other digital medium that can be displayed on a computing device. The secondary media items 147A-B include, and are not limited to, web page content, mobile app content, polls, comment threads, chat forums, status displays, like/dislike counters, digital videos, digital movies, digital photos, digital music, website content, social media updates, real simple syndication (RSS) feeds, advertisements, software applications, or any other media feature than can be associated or related to primary media item 137. In some implementations, the primary content provider server 130 provides both the primary media items 137 and the secondary media items 147. Alternatively, the primary content provider server 130 provides the primary media items 137 and the secondary content provider server 140 provides the secondary media items 147. Yet alternatively, the secondary content provider server 140 provides only specific types of secondary media items 147 (e.g., advertisements) and the primary content provider server 130 provides the primary media items 137 and the remaining types of secondary media items 147.

The servers 130, 140 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, a Multidimensional Expressions (MDX) server, a pairing server, and/or hardware components that can be used to provide a user with access to primary media items 137 and secondary media items 147A-B and/or provide the primary media items 137 and secondary media items 147A-B. The server 130 can be a part of a content sharing platform that can allow users to consume, upload, share, search for, approve of ("like"), dislike, and/or comment on primary media items 137. The content sharing platform may also include a website (e.g., a web page) or application (e.g., mobile application) back-end software that can be used to provide a user with access to the primary media items 137 and secondary media items 147A-B.

For brevity and simplicity, a live chat can be used as an example of secondary media item 147A and a user poll can be used as an example of a secondary media item 147B throughout this disclosure. As used herein, "media," "media item," "online media item," "media feature," "digital media," "digital media item," "content," and "content item" can include an electronic file that can be executed or loaded using software, firmware or hardware configured to present the digital media item to an entity.

In one example, primary media item 137 can be a video selected by a user of first screen device 110, secondary media item 147A can be a live chat associated with the video selected by the user, and secondary media item 147B can be a user poll associated with the video selected by the user. Secondary media items 147A-B can be presented (e.g., by the primary content provider server 130 or the secondary content provider server 140) before, during or after the primary media item 137 is presented on one or more of the first screen devices 110. First screen device 110 can include computing devices such as personal computers (PCs), laptops, mobile phones, smart phones, tablet computers, netbook computers, network-connected televisions, etc. In some implementations, a first screen device can also be referred to as a "client device," a "user device," or a "user electronic."

The first screen device 110 can include one or more applications (e.g., first screen application 112) for playing, displaying, or presenting the primary media items 137 and the secondary media items 147A-B. The applications can include a web browser, a web application, a media playing application or software, or a native mobile application (mobile app). A web application is a client-server software application that uses a web browser. The web browser renders web pages ("pages") provided by a server to present user interfaces on the first screen device 110. A media playing application (or software) can be any application capable of displaying media content, such as a digital video, on the first screen device. A native mobile app is an application for a mobile device that is operable with a particular operating system of the mobile device. The mobile application can provide different screen visualizations that can be represented by a user interface (UI). The mobile application can include a home page UI that can be presented when a user opens the mobile application on the first screen device 110.

A UI of the first screen application 112 (a mobile app, a web browser or a web app) may include navigation, command, and content UI elements. The first screen application 112 can include a media player (e.g., video player, music player, audio player) for playing a media item on the first screen device 110. A media player can be embedded in a web page provided to a web browser or in a UI of a mobile app.

The system architecture 100 can include one or more second screen devices 120. The second screen device 120 can include a television, a monitor, a computer system (e.g., desktops, laptops, tablets, phablets), a virtual reality (VR) system (e.g., VR headset), mobile phone, a projector, or any other computing device capable of displaying content. The second screen device 120 can play primary media items 137 and secondary media items 147A-B by directly streaming the primary media items 137 and the secondary media items 147A-B via network 150. In some implementations, the first screen device 110 is a small-screen device (e.g., a smartphone) and the second screen device 120 is a large-screen device (e.g., a televisions).

The first screen device 110 can be coupled to one or more second screen devices 120 via, for example, network 155 for identifying the primary media item 137 and the secondary media items 147A-B for presentation on the second screen device(s) 120. The second screen device 120 and the first screen device 110 can include wireless technology for establishing a connection between the second screen device 120 and the first screen device 110. The wireless communication technology can include peer-to-peer (P2P), Bluetooth®, Whisper®, Wi-Fi®, Wi-Fi Direct (Wi-Fi P2P), infrared, ultrasonic or other technology.

The primary media items 137 and the secondary media items 147A-B can be identified for presentation on the second screen device 120 by the first screen device 110 using CAST (casting) technology, DIAL (dialing) technology, and/or mirroring technology. Casting technology and mirroring technology refers to content streaming and playback that involves a first device (e.g., first screen device 110) identifying content (e.g., primary media item 137) to be played and a second device (e.g., second screen device 120) providing the playback of the identified content.

In casting and dialing technology, in some implementations, the first screen device 110 can send a universe resource identifier (URI) (e.g., universe resource locator (URL)) for the primary media item 137 to the second screen device 120 and the second screen device 120 can use the URI to obtain the primary media item 137 from the primary content provider server 130 via network 150. The second screen device 120 receives the primary media item 137 and streams the primary media item 137 from the URI directly to the second screen device 120 (e.g., a television). The first screen device can also send a URI (or any other type of identifier) for a secondary media item(s) 147A-B to the second screen device 120 and the second screen device 120 can use the URI to obtain the secondary media item(s) 147A-B from the secondary content provider server 130 via network 150.

In other implementations, the first screen device 110 can send a request to the primary content provider server 130 for the primary media item 137 to be transmitted to the second screen device 120 via network 150. The second screen device 120 receives the primary media item 137 from the primary content provider server 130 and streams the primary media item 137. The first screen device can also send a request to the secondary content provider server 140 for a secondary media item(s) 147A-B to be transmitted to the second screen device 120 via network 150. The second screen device 120 receives the secondary media item(s) 147A-B from the secondary content provider server 140 and streams the secondary media item(s) 147A-B.

In mirroring technology, the first screen device 110 receives the primary media item 137 (e.g., video) stream over the network 150, repackages the stream, and streams the re-formatted stream via network 115 to the second screen device 120. The second screen device 120 then presents the primary media item 137. The first screen device 110 can also receive the secondary media items 147A-B (e.g., media features) over the network 150, repackage the stream, and stream the re-formatted stream via network 115 to the second screen device 120. The second screen device 120 then presents the secondary media items 147A-B.

First screen application 112 on the first screen device 110 can load application UI (e.g., web page, mobile application UI) that may include a primary media item 137 and secondary media items 147A-B. In an example, the first screen application can receive the primary media item 137 and the secondary media items 147A-B and render them on a graphical user interface ("GUI").

The primary media item 137 and/or the secondary media items 147A-B can be stored in a data store 116 of the first screen device. The data store 116 can be a cache in which the primary media item 137 and the secondary media items 147A-B are stored upon being retrieved or received from the primary content provider 130 (and optionally the secondary content provider 140). Alternatively, the data store 116 can store primary media items 137 and secondary media items 147A-B that were downloaded or saved to the data store 116 from another source.

In one implementation, the first screen application 112 sends a request to the primary content provider server 130 for a primary media item 137. In an example, the request can also include a request for one or more secondary media items 147A-B. In another example, the secondary media item(s) 147A-B can be transmitted to the first screen device 110 without a need for a request (e.g., the secondary media item(s) 147A-B can be bundled with the primary media item 137 or transmitted subsequent to the primary media item 147).

The first screen device can include a feature pinning manager 114. The feature pinning manager 114 can enable the first screen device 110 to pin one or more media features (e.g., secondary media items 147A-B) onto the second screen device 120. Pinning of a media feature refers to an identification of a media feature on the first screen device 110 for presentation on the second screen device using a presentation protocol such as CAST, DIAL (discover and launch), AirPlay, screen mirroring, manual pairing, SMART-GLASS, MIRACAST, etc. The media feature may be presented in association with the respective primary media item 137 and the presentation of the media feature may stop once the primary media item is no longer presented on the second screen device 120. The feature pinning manager 114 can use a framework or a media message type to pin and unpin the secondary media items 147A-B onto the second screen device 120. The framework or a media message type can be the same, similar, or different to a framework or message type used to cast the primary media item 137 on the second screen device 120.

Each media feature can be displayed with an associated pin UI element (e.g., a button, an icon, a check box, etc.) on the interface of the first screen application 112. In an example, the first screen device 110 can receive, on the interface of the first screen application 112, a user selection (or activation) of the pin UI element to pin a media feature to the second screen device 120. In response to the user selection, the feature pining manager 114 can pin the media feature to the second screen device 120, where a screen of the second screen device 120 displays the pinned media feature. In some implementations, the feature pinning manager 114 can transmit a pin request via network 150 to server 130 and/or 140. The pin request can indicate which media feature is to be transmitted to the second screen device 120. In other implementations, the feature pinning manager 114 can transmit, via network 155, a pin request directly to the second screen device 120, whereby the second screen device 120 can then request the media feature via network 150 to servers 130 and/or 140. In yet other implementations, the feature pinning manager 114 can transmit graphics data representing the media feature directly to the second screen device 120 via network 155.

The feature pinning manager 114 can further enable the first screen device 110 to unpin one or more pinned media features (e.g., secondary media items 147A-B) from the second screen device 120. In an example, once a media feature is pinned from the first screen device 110 to the second screen device 120, the user can select an unpin UI element on the interface of the first screen application 112. The unpin UI element can be the same as the pin UI element but with state changed to unpin or a different UI element. For example, once the pin UI element is selected, the pin UI element can change its state to an unpin UI element and can be displayed by a different icon. That is, the state of the pin UI element can reflect the action performed when the pin UI element is selected. Once the unpin UI element is selected, the first screen device 110 can transmit an unpin request to the servers 130 and/or 140, or to the second screen device 120. In some implementations, the feature pinning manager 114 can transmit an unpin request via network 150 to servers 130 and/or 140. The unpin request can indicate which media feature is to be removed from the second screen device 120. In some implementations, the feature pinning manager 114 can transmit, via network 155, an unpin request directly to the second screen device 120, whereby the second screen device 120 can then request, via network 150, that servers 130 and/or 140 remove the pinned feature. Alternatively, the second screen device 120 can remove the pinned feature from display directly in response to the unpin request from the first screen device 110.

The second screen device can include a pin feature presenter 124. The pin feature presenter 124 can enable the second screen application 122 to present (pin) media features on a display of the second device 120. The pin feature presenter 124 can request media features from server 130 (or 140) in response to a pin request from the first screen device 110. The pin feature presenter 124 can further unpin previously pinned media features from the second screen device 120.

In some implementations, the pin feature presenter 124 can pin the media features to one or more display locations on the display of the second screen device 120. The display locations can be provided by the first screen device 110 or primary or secondary content provider server 130 or 140 together with graphics or other data defining the media features or in a separate communication (e.g., as a separate instruction identifying a media feature by a unique identifier and including location information for that media feature). The location information can broadly specify the position of the media feature in connection to the video (e.g., above the video or a media player, below the video or the media player, on the left side of the video, etc.) or provide more specific location information (e.g., specific distance from the video or media player, specific direction with respect to the video or video player, etc.).

According to some aspects of the present disclosure, the pin feature presenter 124 can designate any number of display locations (e.g., three locations, four locations, etc.) for pinning media features. Each display location can be predetermined or set (and re-set) by user input. In some implementations, each display location can have a rank (e.g., a first locations has a first rank, a second location has a second rank, etc.). In response to receiving a request to pin a media feature, the pin feature presenter 124 can pin the media feature to an available location with the highest rank. The ranks can be predetermined or set (and re-set) by user input. The user can set the ranks and the display locations via the first screen device 110, the second screen device 120, or via a further user device. The first screen device 110 or the further user device can transmit an instruction indicating the ranks and/or display locations to the second screen device 120 via a network (e.g., network 155, network 150, etc.) The instructions can be transmitted before, during or after the media feature is pinned on the second screen device 120. For example, the pin feature presenter 124 can receive a request to pin a media feature onto the second screen device 120 from the first screen device 110, request and receive the media feature from a server (e.g., secondary content provider server 140), pin the received media feature to a first display location with the highest rank, and then receive and execute an instruction from the first screen device 110 to move the pinned media feature to a second display location.

In some implementations, the pin feature presenter 124 can move a pinned media feature from a first display location to a second display location. For example, a user can pin a media feature onto the second screen device 120 using the first screen device 110. The user can then move the media feature from a first display location to a second display location via the interface of the first screen application 112. In response to the move, the first screen device 110 can transmit an instruction to the second screen device 120 to move the media feature from the first location to a second location. The pin feature presenter 124 can then execute the instruction by moving the media feature from the first location to the second location. In some implementations, the user can move the media feature by free-hand to any desired location. For example, the user can use the interface on the first screen application 112 to move a pinned media feature by pressing the media feature and dragging the media feature from a first location to a second location. During this process, the first screen device 110 can transmit instructions (e.g., using the casting or mirroring protocol) to the second screen device to mimic the movements performed at the first screen application 112 on the second screen application 122. In some implementations, the display location for presenting a pinned media feature on the second screen device 120 can be similar or the same as the location of the media feature as displayed on the first screen device 110. For example, if a media feature is displayed to the right of the video on the display of the first screen device 110, the second screen device 120 can pin and display the media feature in a similar location. In some implementations, the pin feature presenter 124 can scale and or reposition the video to proportionally present the pinned media feature on the display of the second screen device 120.

Figure 2:
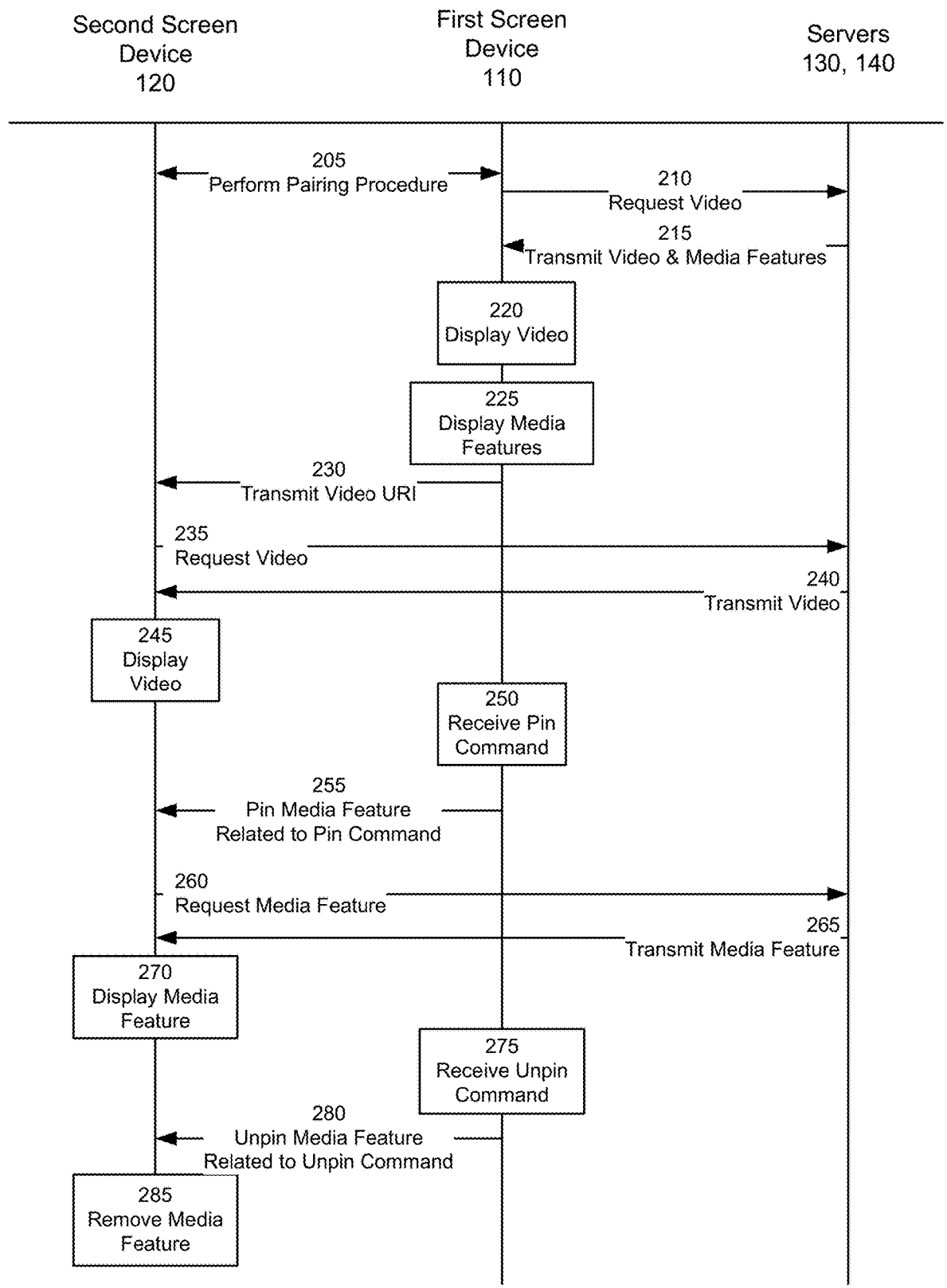
FIG. 2 depicts an interaction diagram of a method for enabling media features provided on a first screen device to be presented on a second screen device, according to an embodiment.

FIG. 2 is an interaction diagram showing a process for enabling media features provided on a first screen device to be presented on a second screen device that is paired to the first screen device, in accordance with some aspects of the disclosure. In various embodiments, the method may include different and/or additional operations than those described in conjunction with FIG. 2. Additionally, in some embodiments, the operations may be performed in a different order than described in conjunction with FIG. 2.

A first screen application 112 operating on a first screen device 110 performs a pairing procedure 205 between the first screen device 110 and the second screen device 120. In an example, the pairing procedure can include a using a wireless communication technology, such as, peer-to-peer (P2P), Bluetooth®, Whisper®, Wi-Fi®, Wi-Fi Direct (Wi-Fi P2P), infrared, ultrasonic or other technology. The first screen application 112 can request 210 a primary media item 137 from the primary content provider server 130. By way of example, the primary media item 137 is a video. In response to request 210, primary content provider server 130 can transmit the requested video to the first screen device 110. Additionally one or more media features (e.g., secondary media items 147A-B) can be transmitted to the first screen device 110 (e.g., by the primary content provider server 130 or the secondary content provider server 140). By way of example, the secondary media items 147A-B are a live chat and a user poll. The first screen application 112 can receive the video (e.g., the primary media item 137), the live chat and the user poll (e.g., the secondary media items 147A-B) and display (render) the video 220 and the media features 225 (the live chat and the user pool) on a graphical user interface of the first screen application 112.

The first screen device 110 can cast the video on the second screen device (e.g., a television). Specifically, the first screen application 112 can transmit a video URI 230 to the second screen application 122 of the second screen device 120. In response to receiving the video URI, the second screen application 122 can request the video 235 from the primary content server 130. In response to the request, the primary content server 130 can transmit the video 240 to the second screen device 120. The second screen application 122 can display the video 245 on a display of the second screen device 120. In an example, the video can be concurrently presented on the first screen device and on the second screen device. In another example, the video can only be presented on the second screen device while the first screen device can present a placeholder. The placeholder can include an icon, a blank space, a frame (e.g., thumbnail) of the video, etc.

The first screen application 112 can receive a pin command 250 via user input on the user interface requesting to pin a media feature from the first screen device 110 onto the second screen device 120. For example, a user of the first screen device 110 can select a pin button associated with the live chat media feature. The selection of the pin button can indicate a user request of the presentation of the live chat on the second screen device 120. The feature pinning manager 114 of the first screen device 110 can then transmit an instruction/request to the second screen device 120 to pin the media feature (e.g., the live chat) related to the pin command 255. In response to receiving the pin command, the second screen device 120 can request the media feature 260 from the primary content provider server 130 (or secondary content provider server 140). In the alternative, the first screen device 110 can transmit the instruction/request to pin the media feature (e.g., the live chat) on the second screen device 120 to the primary content provider server 130 (or secondary content provider server 140), which can transmit the media feature 265 to the second screen device 120. The second screen device 120 can display the media feature 270. For example, the second screen device 120 can display live chat on its display, in addition to the video. The first screen device 110 can receive an unpin command 275 by user input via the user interface. For example, the user may select an unpin button associated with the live chat. The unpin UI element can be in the same location as was the pin UI element, but can now be represented by a different button, icon, checkbox etc. In response to the user input, the first screen device 110 can transmit an unpin media feature command 280 to the second screen device 120. The second screen device 120 can then remove the media feature (e.g., the live chat) 285 from being presented on its display. It is noted that additional media features (e.g., the user poll, etc.) can be pinned to the second screen device using the processes discussed above.

The seconds screen device 120 can update pinned media features in real-time. In an example, a comments section or live chat can be pinned to the second screen device 120. A user can submit a new post to the comments section or live chat. The user can be a user viewing the pinned media features on the second screen device 120, or can be a user who is unaffiliated with the second screen device 120 (e.g., is located a distance away from the second screen device 120 such as in a different building, city or country). Once the new post is added to the comments section or live chat, the second screen device 120 can dynamically update the pinned comments section or live chat to reflect the new post in real-time (e.g., with an insignificant delay of milliseconds) by, for example, receiving/obtaining updated content from the first screen device 110, receiving/obtaining updated content from a server (e.g., the secondary content provider server 140), etc. Accordingly, media features pinned to the second screen device 120 can dynamically reflect new submissions or changes.

Figure 3:
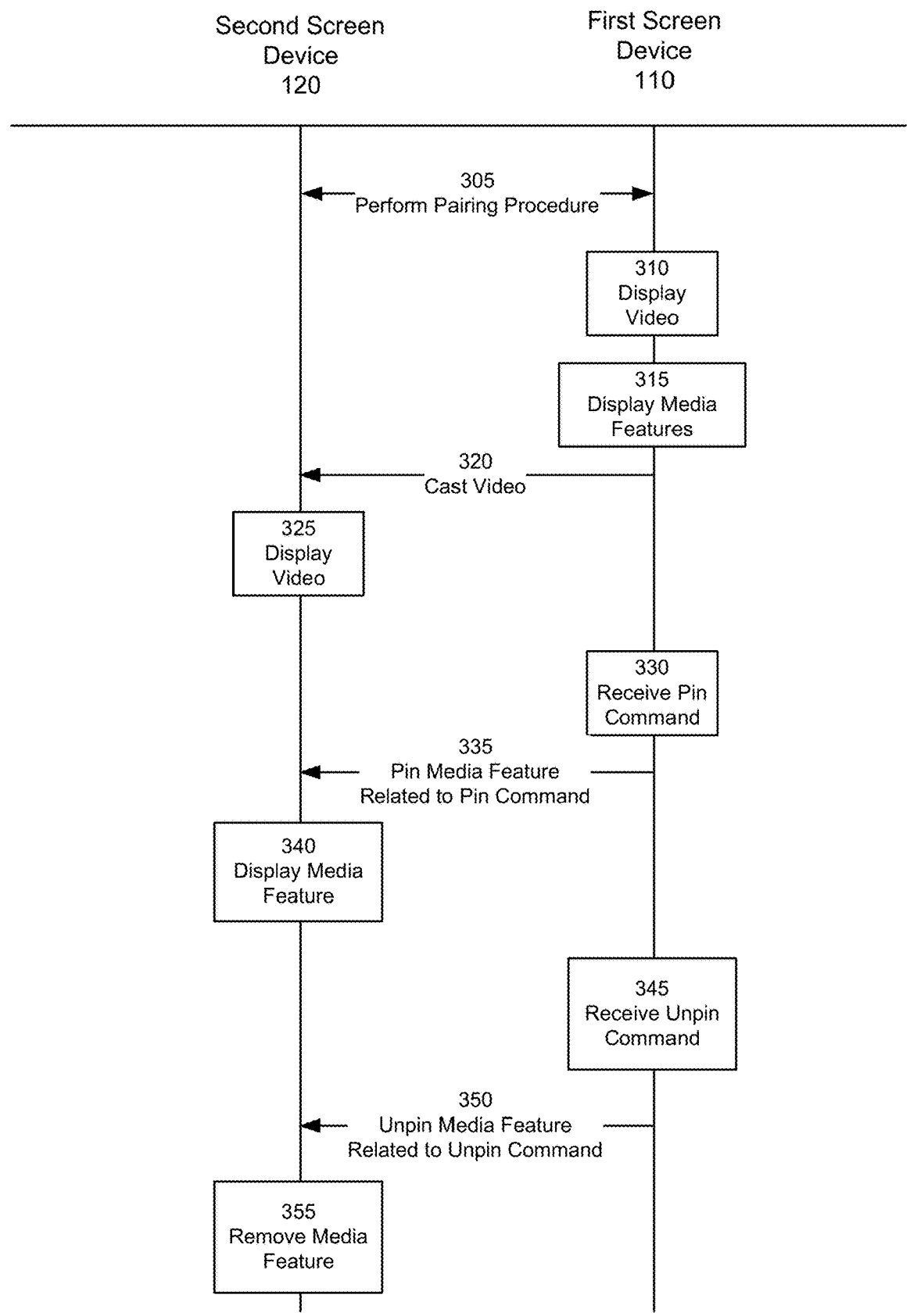
FIG. 3 depicts an interaction diagram of a method for enabling media features provided on a first screen device to be presented on a second screen device, according to an embodiment.

FIG. 3 is an interaction diagram showing another process for enabling media features provided on a first screen device to be presented on a second screen device that is paired to the first screen device, in accordance with some aspects of the disclosure. In various embodiments, the method may include different and/or additional operations than those described in conjunction with FIG. 3. Additionally, in some embodiments, the operations may be performed in a different order than described in conjunction with FIG. 3.

A first screen application 112 operating on a first screen device 110 performs a pairing procedure 305 between the first screen device 110 and the second screen device 120. The first screen application 112 can display a video 310 (or any other primary media item 137) on the first screen device 110. The video can be received from a server (e.g., primary content provider server 130), or retrieved from data store 116. The first screen application 112 can further display one or more media features 315 (e.g., secondary media items 147A-B) associated with the video. The media feature can be retrieved from a server (e.g., the primary content provider server 130, the secondary content provider server 140, a further server, etc.), or retrieved from data store 116.

The first screen device 110 can cast the video 320 onto the second screen device. For example, the first screen application 112 can transmit the video to the second screen device 120 using functions associated with a pairing protocol. In response to receiving the cast, the second screen application 122 can display the video 325 on a display of the second screen device 120.

The first screen application 112 can receive a pin command 330 via user input on the user interface requesting to pin a media feature from the first screen device 110 onto the second screen device 120. For example, a user of the first screen device 110 can select a pin button associated with the media feature. The feature pinning manager 114 of the first screen device 110 can then transmit an instruction/request to the second screen device 120 to pin the media feature (e.g., the live chat) related to the pin command 335. The pin command can include a data packet including the media feature. In response to receiving the pin command, the second screen device 120 can display the media feature 340 related to the pin command.

The user device 110 can receive an unpin command 345 by user input via the user interface. For example, the user can select an unpin button associated with the media feature. In response to the user input, the first screen device 110 can transmit an unpin media feature command 350 to the second screen device 120. The second screen device 120 can then remove the media feature 355 from being presented on its display.

Figure 4:
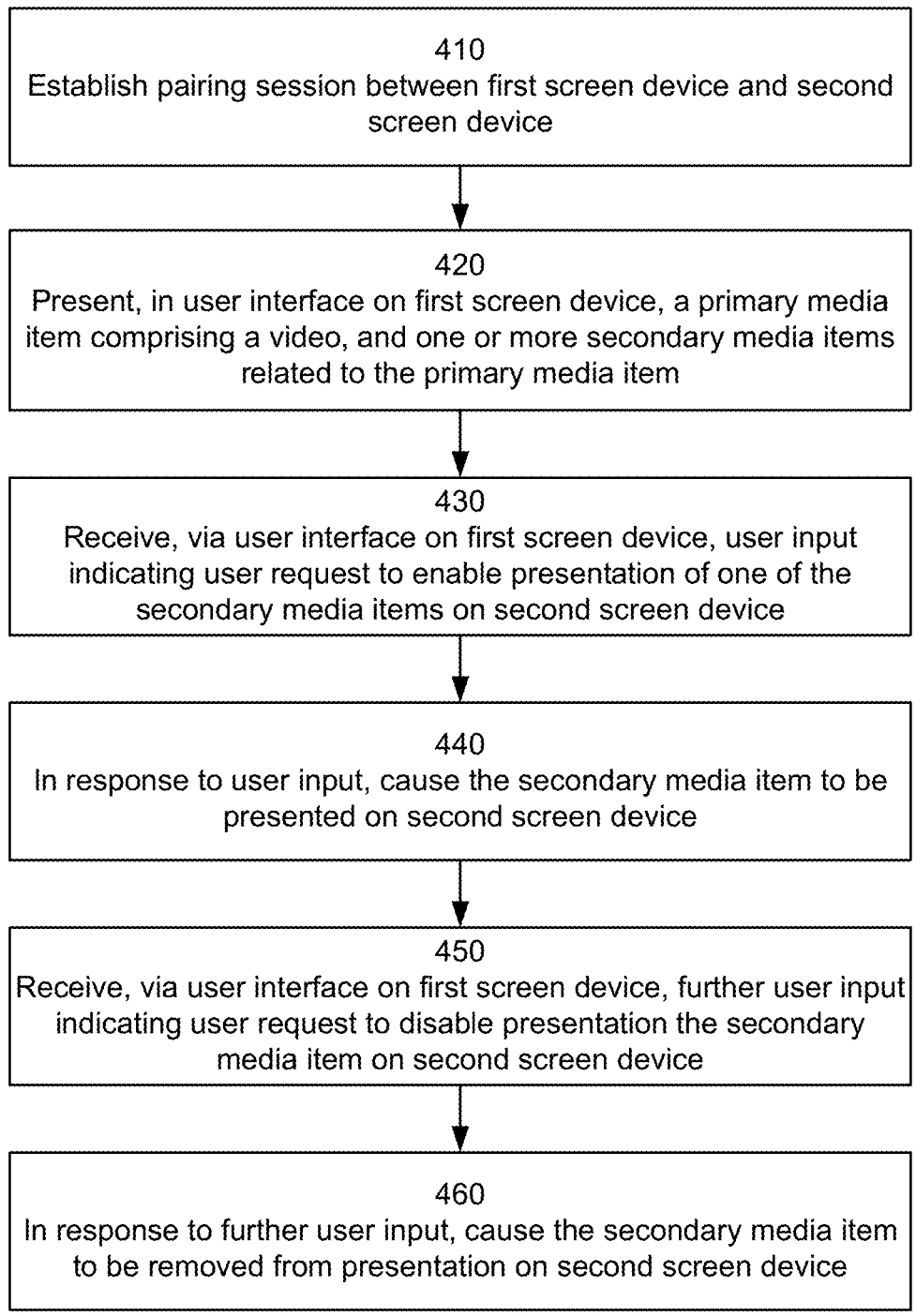
FIG. 4 depicts a flow diagram of a method for enabling media features provided on a first screen device to be presented on a second screen device, in accordance with one implementation of the present disclosure.

FIG. 4 depicts a flow diagram of a method 400 showing a process for enabling media features provided on a first screen device to be presented on a second screen device that is paired to the first screen device, in accordance with some aspects of the disclosure. The method 400 is performed by processing logic that may comprise hardware (circuitry, dedicated logic, etc.), software (such as is run on a general purpose computer system or a dedicated machine), or a combination of both. In one implementation, the method is performed by a first screen application 112 and/or the feature pinning manager 114 in the first screen device of FIG. 1, while in some other implementations one or more blocks of FIG. 4 may be performed by another machine. In one implementation, a processing device of a user device (e.g., firsts screen device 110 in FIG. 1) performs method 400.

At block 410, the processing device establishes a pairing session between a first screen device and a second screen device. The first screen device can be a smartphone, a laptop, or any other computing device capable of displaying a primary media item, such as a video. The second screen device can be a television, a projector, or any other computing device capable of displaying a primary media item. The pairing session can be established using any pairing protocol, such as, but not limited to, peer-to-peer (P2P), Bluetooth®, Whisper®, Wi-Fi®, Wi-Fi Direct (Wi-Fi P2P), infrared, ultrasonic or other technology.

At block 420, the processing device presents, in a user interface on the first screen device, a primary media item such as a video and one or more secondary media items (one or more media features) related to the video. The media features can pertain to at least one of a presentation of the video or user feedback about the video. Media features that pertain to user feedback about the video can include, for example, polls, comment threads, chat forums, status displays, like/dislike counters, etc. Media features that pertain to the presentation of the video may not include feedback about the video but rather be related to the video by virtue of being presented on the first screen device together with the video. Media features that pertain to the presentation of the video can include, for example, web page content, mobile app content, digital videos, digital movies, digital photos, digital music, website content, social media updates, real simple syndication (RSS) feeds, advertisements, software applications, etc. In an example, the video can be concurrently presented on the first screen device and on the second screen device. In another example, the video can only be presented on the second screen device while the first screen device can present a placeholder and the media features. The placeholder can include an icon, a blank space, a frame of the video, etc.

At block 430, the processing device receives, via the user interface on the first screen device, user input indicating a user request to enable presentation of at least one of the media features related to the video on the second screen device. In some implementations, the user input may be received while the video is being played on the first screen device and concurrently played on the second screen device. Alternatively, the user input may be received while the video is being displayed on the first screen device and played on the second screen device. In an example, the user request may include a pin command requesting to pin a media feature onto the second screen device. At block 440, in response to the user input, the processing device causes the at least one of the media features to be presented on the second screen device. For example, the processing device can transmit a pin command from the first screen device to the second screen device. The pin command can instruct the second screen device to present the media feature. As discussed in more detail above, in some implementations, the pin command may include the location information for positioning the media feature on the second screen device. Alternatively, the location information can be provided to the second screen device separately.

At block 450, the processing device receives, via the user interface on the first screen device, further user input indicating a user request to disable presentation of the pinned media feature on the second screen device. In some implementations, the user input may be received while the video is being played on the first screen device and concurrently played on the second screen device. Alternatively, the user input may be received while the video is being displayed on the first screen device and played on the second screen device. In an example, the user request may include an unpin command requesting to unpin the pinned media feature from the second screen device. At block 460, in response to the further user input, the processing device causes the at least one of the media features to be no longer presented on the second screen device. For example, the processing device can transmit an unpin command from the first screen device to the second screen device. The unpin command can instruct the second screen device to end the presentation of the media feature.

Figure 5:
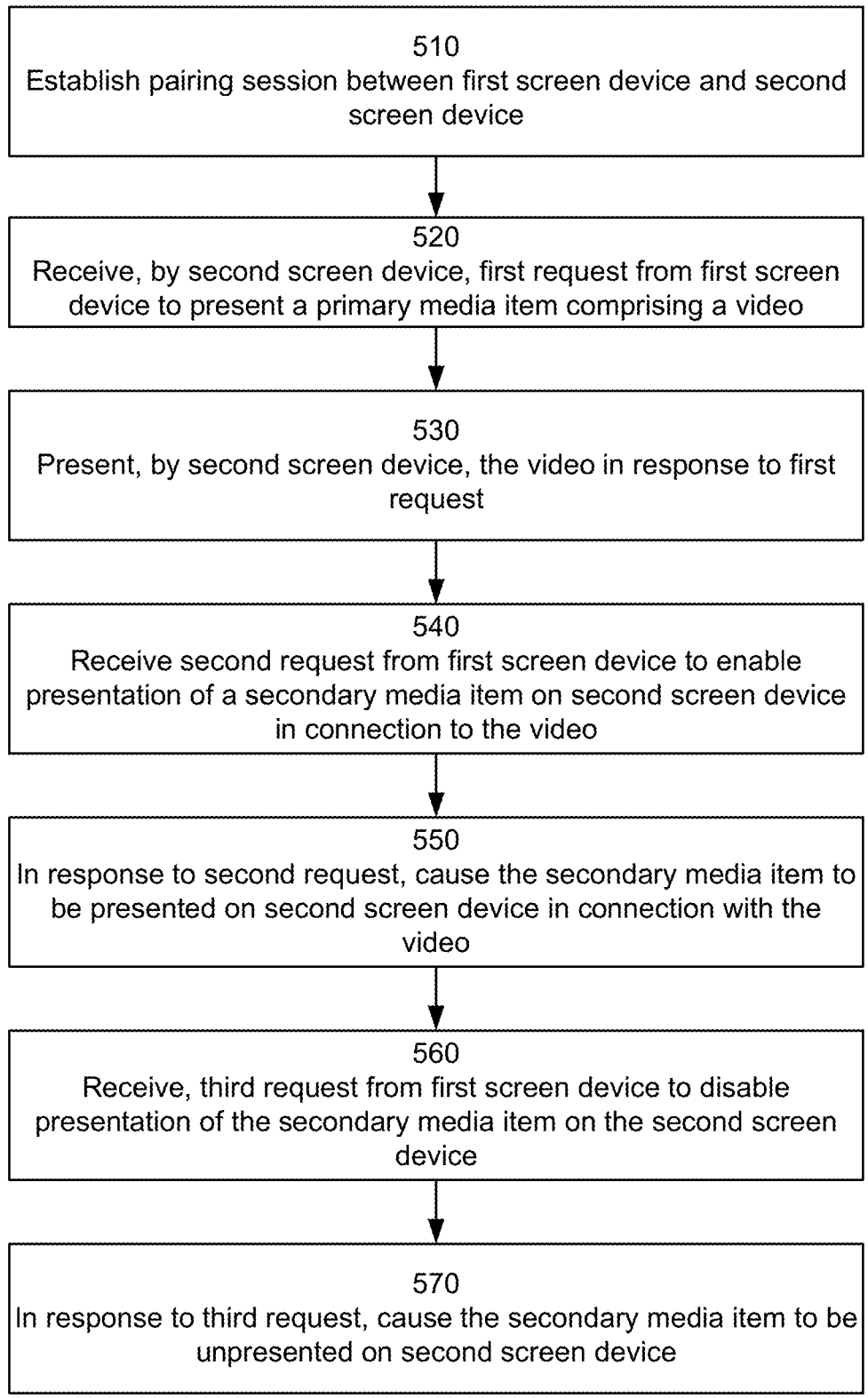
FIG. 5 depicts a flow diagram of a method for enabling media features provided on a first screen device to be presented on a second screen device, in accordance with one implementation of the present disclosure.

FIG. 5 depicts a flow diagram of a method 500 showing a process for enabling media features provided on a first screen device to be presented on a second screen device that is paired to the first screen device, in accordance with some aspects of the disclosure. The method 500 is performed by processing logic that may comprise hardware (circuitry, dedicated logic, etc.), software (such as is run on a general purpose computer system or a dedicated machine), or a combination of both. In one implementation, the method is performed by the second screen application 122 and/or the pin feature presenter 124 in the second screen device 120 of FIG. 1, while in some other implementations one or more blocks of FIG. 5 may be performed by another machine. In one implementation, a processing device of a user device (e.g., second screen device 120 in FIG. 1) performs method 500.

At block 510, the processing device identifies a pairing session between a first screen device and a second screen device. The first screen device can be a smartphone, a laptop, or any other computing device capable of displaying a primary media item, such as a video. The second screen device can be a television, a projector, or any other computing device capable of displaying a primary media item.

At block 520, the processing device receives a first request from the first screen device to present a video. It should be understood that a video is used by way of example, and that the processing device can receive a request to present any kind of primary media item. For example, the processing device can receive a cast instruction from the first screen device. In block 530, the processing device presents (displays) the video in response to the first request. The video can be concurrently presented on the first screen device.

At block 540, the processing device receives a second request from the first screen device to enable presentation of a media feature in association with the video on the second screen device in connection to the video. In some implementations, the request may be received while the video is being played on the first screen device and concurrently played on the second screen device. Alternatively, the user input may be received while the video is being displayed on the first screen device and played on the second screen device. At block 550, the processing device, in response to the second request, causes the media feature to be presented on the second screen device concurrently or along with the video. In some implementations, the request can be a pin command and can include the location information for positioning the media feature on the second screen device. Alternatively, the location information can be provided to the second screen device in a separate request/command. At block 560, the processing device receives a third request from the first screen device to disable presentation of media feature on the second screen device. At block 570, the processing device, in response to the third request, end the presentation of the media feature on the second screen device.

FIGS. 6A-6B are illustrations of example graphical user interfaces (GUI) on a first screen device to enable a media feature provided on the first screen device to be presented on a second screen device, in accordance with some aspects of the disclosure. Specifically, FIG. 6A shows first screen device 600A (e.g., a smartphone) displaying a video 610A on an interface of a first screen application 605A. A comments section 615A (e.g., a media feature) associated with the video 610A is also displayed on the interface of the first screen application 605A. The comments section 615A includes a pin UI element in the form of a button 640A. The first screen device 600A enables presentation of the video 610A on a paired second screen device 620A (e.g., a television). For example, the first screen device 600A uses a casting protocol to present the video 610A on the second screen device 620A. Accordingly, second screen device 620A displays video 625A. It is noted that no media features (e.g., the comments section 615A) are displayed on the second screen device 620A. A user input selecting the pin button 640A generates the illustration shown in FIG. 6B.

FIG. 6B shows a first screen device 600B displaying a video 610B on an interface of a first screen application 605B. A comments section 615B associated with the video 610B is also displayed on the interface of the first screen application 605B. The first screen device 600B enables presentation of the video 610B on a paired second screen device 620B. By selecting the pin button 640A, the first screen device 600B enables presentation of (pins) the comments section 615B on the second screen device 620B. Accordingly, the seconds screen device 620B displays video 625B and comments section 630B. When the pin button 640A is selected, its state is changed to transform into unpin button 640B. A user input selecting unpin button 640B can cause the comments section 360B to no longer be presented on the second screen device 620B, and the unpin button 640B to transform into the pin button 640A.

Figure 7:
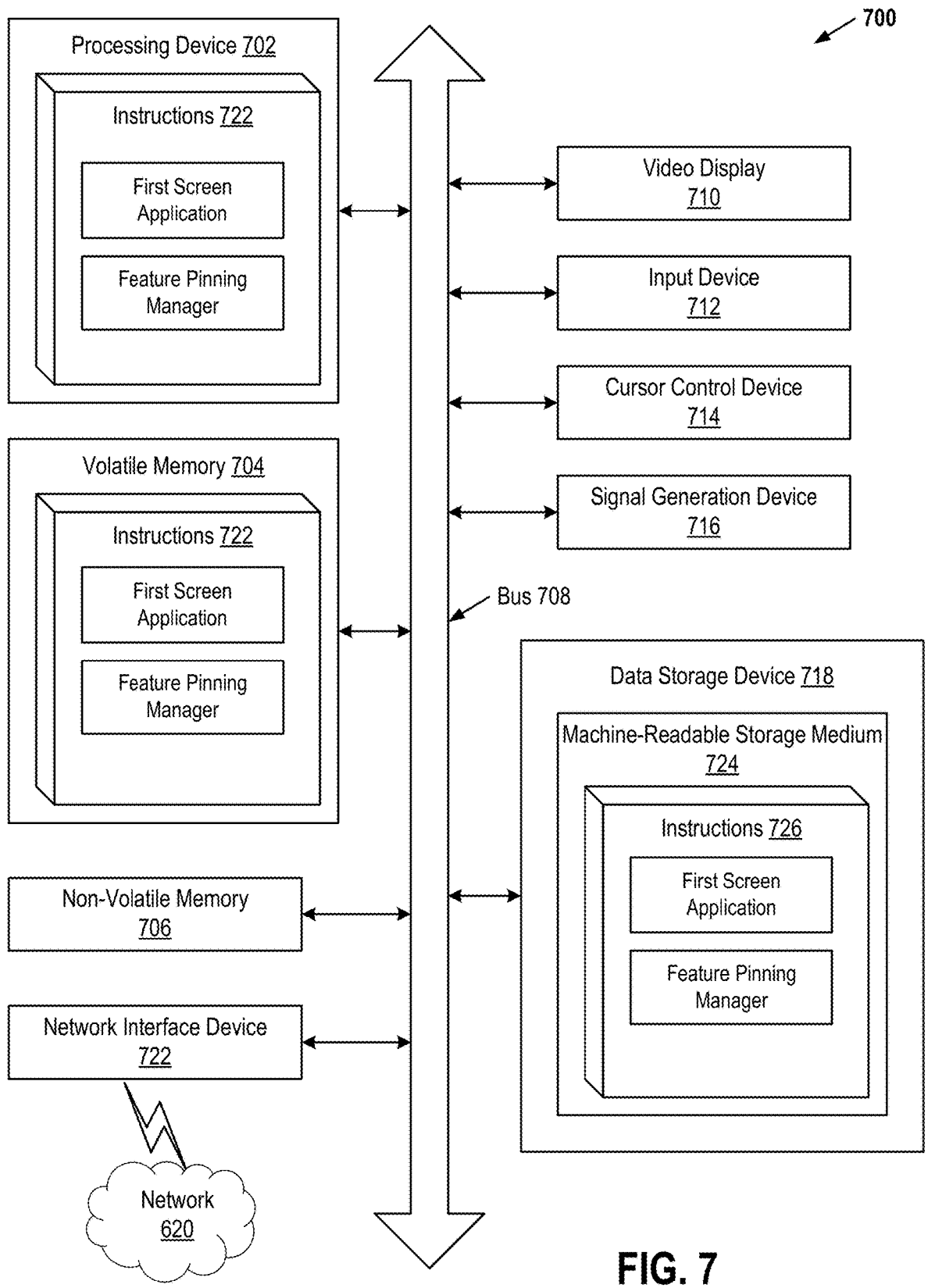
FIG. 7 depicts a block diagram of an example computing device operating in accordance with one or more aspects of the present disclosure.

FIG. 7 depicts a block diagram of a computer system operating in accordance with one or more aspects of the present disclosure. In certain implementations, computer system 700 may be connected (e.g., via a network, such as a Local Area Network (LAN), an intranet, an extranet, or the Internet) to other computer systems. Computer system 600 may operate in the capacity of a user device. Computer system 700 may operate in the capacity of a server or a client computer in a client-server environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 702, a volatile memory 704 (e.g., random access memory (RAM)), a non-volatile memory 706 (e.g., read-only memory (ROM) or electrically-erasable programmable ROM (EEPROM)), and a data storage device 718, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an input device 612 (e.g., a keyboard, an alphanumeric keyboard, a motion sensing input device, touch screen), a cursor control device 714 (e.g., a mouse), and a signal generation device 716.

Data storage device 718 may include a non-transitory machine-readable storage medium 624 on which may store instructions 726 encoding any one or more of the methods or functions described herein, including instructions encoding components of first screen device of FIG. 1 for implementing method 400, and/or components of second screen device of FIG. 1 for implementing method 500.

Instructions 726 may also reside, completely or partially, within volatile memory 704 and/or within processing device 702 during execution thereof by computer system 700, hence, volatile memory 704 and processing device 702 may also constitute machine-readable storage media.

While machine-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "sending," "displaying," "identifying," "selecting," "excluding," "creating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    presenting, in a user interface of a mobile application on a first screen mobile device, a primary media item comprising a video, and one or more secondary media items related to the primary media item, wherein the primary media item and the one or more secondary media items are concurrently presented on a second screen device which is in a pairing session with the first screen mobile device;
    receiving, via the user interface of the mobile application on the first screen mobile device, user input indicating a user request to disable presentation of a secondary media item of the at least one or more secondary media items on the second screen device; and in response to the user input, causing the secondary media item to be no longer presented on the second screen device, while maintaining presentation of the secondary media item on the first screen mobile device.

2. The method of claim 1, wherein the user input comprises a user selection of a pin user interface (UI) element associated with the one or more secondary media items.

3. The method of claim 2, further comprising:
detecting the user selection of the pin UI element; and
changing a state of the pin UI element to a pin state, wherein selection by the user of the pin UI element in the pin state causes a respective secondary media item associated with the pin UI element to be presented on the second screen device.

4. The method of claim 1, wherein the secondary media items comprise at least one of a comment section, a live chat, a user poll, a recommended video, a recommended audio, or an advertisement.

5. The method of claim 1, wherein the first screen mobile device is at least one of a smartphone or a laptop computer.

6. The method of claim 1, wherein the second screen device is at least one of a television or a projector.

7. The method of claim 1, further comprising:
receiving, via the user interface of the mobile application on the first screen mobile device, further user input indicating a further user request to enable presentation of the one or more of the secondary media items on the second screen device; and
in response to the further user input, causing the one or more secondary media items to be presented on the second screen device concurrently with the primary media item on the second screen device.

8. A system comprising:
a memory; and
a processing device, coupled to the memory, configured to perform operations comprising:
presenting, in a user interface of a mobile application on a first screen mobile device, a primary media item comprising a video, and one or more secondary media items related to the primary media item, wherein the primary media item and the one or more secondary media items are concurrently presented on a second screen device which is in a pairing session with the first screen mobile device;
receiving, via the user interface of the mobile application on the first screen mobile device, user input indicating a user request to disable presentation of a secondary media item of the at least one or more secondary media items on the second screen device; and
in response to the user input, causing the secondary media item to be no longer presented on the second screen device, while maintaining presentation of the secondary media item on the first screen mobile device.

9. The system of claim 8, wherein the user input comprises a user selection of a pin user interface (UI) element associated with the one or more secondary media items.

10. The system of claim 9, wherein the operations further comprise:
detecting the user selection of the pin UI element; and
changing a state of the pin UI element to a pin state, wherein selection by the user of the pin UI element in the pin state causes a respective secondary media item associated with the pin UI element to be presented on the second screen device.

11. The system of claim 8, wherein the secondary media items comprise at least one of a comment section, a live chat, a user poll, a recommended video, a recommended audio, or an advertisement.

12. The system of claim 8, wherein the first screen mobile device is at least one of a smartphone or a laptop computer.

13. The system of claim 8, wherein the second screen device is at least one of a television or a projector.

14. The system of claim 8, wherein the operations further comprise:
receiving, via the user interface of the mobile application on the first screen mobile device, further user input indicating a further user request to enable presentation of the one or more of the secondary media items on the second screen device; and
in response to the further user input, causing the one or more secondary media items to be presented on the second screen device concurrently with the primary media item on the second screen device.

15. A method, comprising:
presenting, by a first screen device, a primary media item and one or more secondary media items, wherein the primary media item and the one or more secondary media items are concurrently presented on a mobile application of a second screen mobile device which is in a pairing session with the first screen device;
receiving a request from the second screen mobile device to disable presentation of a secondary media item of the at least one of the secondary media items on the first screen device; and
in response to the request, ending a presentation of the secondary media item on the first screen device, wherein presentation of the secondary media item is maintained on the second screen mobile device.

16. The method of claim 15, wherein the secondary media items comprises at least one of a comment section, alive chat, a user poll, a recommended video, a recommended audio, or an advertisement.

17. The method of claim 15, wherein the first screen device is at least one of a television or a projector.

18. The method of claim 15, wherein the second screen mobile device is at least one of a smartphone or a laptop computer.

19. The method of claim 15, further comprising:
updating content of each of the secondary media items on the first screen device as content of a respective secondary media item changes on the second screen mobile device.

20. The method of claim 15, further comprising:
receiving a further request from the second screen mobile device to enable presentation of at least one of the secondary media items on the first screen device; and
in response to the further request, enabling a presentation of the at least one of the secondary media items on the first screen device.

* * * * *